(12) United States Patent
Bastioli et al.

(10) Patent No.: US 6,730,724 B1
(45) Date of Patent: May 4, 2004

(54) BIODEGRADABLE COMPOSITIONS COMPRISING STARCH AND POLYSACCHARIDE ESTERS

(75) Inventors: Catia Bastioli, Novara (IT); Roberto Lombi, Novara (IT); Matteo Nicolini, Cressa (IT); Maurizio Tosin, Serravalle Sesia (IT); Francesco Degli Innocenti, Novara (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 09/786,189

(22) PCT Filed: Aug. 31, 1999

(86) PCT No.: PCT/EP99/06390

§ 371 (c)(1),
(2), (4) Date: Jun. 6, 2001

(87) PCT Pub. No.: WO00/12616

PCT Pub. Date: Mar. 9, 2000

(30) Foreign Application Priority Data

Sep. 1, 1998 (IT) .......................................... TO98A0735

(51) Int. Cl.⁷ .................................................. C08L 3/00
(52) U.S. Cl. ........................ 524/47; 523/124; 523/128; 524/51; 524/425; 524/436
(58) Field of Search ................................. 523/124, 128; 524/47–51, 35, 41, 425, 436

(56) References Cited

FOREIGN PATENT DOCUMENTS

| EP | 0 596 437 A2 | 5/1994 |
| EP | 0 722 980 A1 | 7/1996 |
| JP | 07102114 A | 4/1995 |

OTHER PUBLICATIONS

*Dewent Publications Ltd.*, London, GB; AN 1995–183084–XP 002125675—"Biodegradable composn, useful for forming mouldings e.g. fibre, resin or film—contains cellulose ester, starch(es) and plasticiser and is easely moulded."

Mayer J. Et Al.: "Biodegradable blends of cellulose acetate and starch: productions and properties"—Journal of Macromolecular Science, Pure and Applied Chemistry, vol. A32, No. 4, 1995, pp. 775–785 (XP–000863347).

*Primary Examiner*—Rabon Sergent
*Assistant Examiner*—U. K. Rajguru
(74) *Attorney, Agent, or Firm*—Bryan Cave LLP

(57) ABSTRACT

The biodegradable heterophase compositions comprise partially or completely destructurised and/or complexed starch, a polysaccharide ester and a plasticizer for the polysaccharide ester. In these compositions, the polysaccharide ester constitutes the matrix and the starch the dispersed phase in the form of particles or domains of numeric mean dimension lower than 1 μm and preferably than 0.5 μm for at least 80% of the particles. The compositions also comprise an additive which can increase and maintain at values of 4 or more the pH of a solution obtained by placing the compositions in pellet form in contact with water at ambient temperature for 1 hour, with the use of a pellet:water ratio of 1:10 by weight.

16 Claims, No Drawings

BIODEGRADABLE COMPOSITIONS COMPRISING STARCH AND POLYSACCHARIDE ESTERS

The present invention relates to biodegradeable compositions comprising starch and polysaccharide esters, suitable for producing moulded articles which can decompose rapidly during composting.

It is reported in the literature that thin cellulose acetate films are rapidly degradable; however, the time required for the biodegradation of thick films or of articles with thick walls is extremely long. For example, two months are required to degrade less than 60% of a thick film.

The problem to be solved in the case of compositions containing starch and cellulose esters consists of the provision of compositions having good biodegradability which are suitable for the production of shaped articles having an adequate capacity to decompose during composting.

Compositions comprising starch and cellulose esters which have improved compatibility between the polymeric components but which do not have adequate biodegradability are described in the patent literature.

For example EP-A0 722 980 describes compositions in which the starch and the cellulose ester are rendered more compatible with one another with the use of specific phase compatibilising agents which are selected from various classes of polymeric substances, and which—in addition to improving compatibility—also have the effect of improving biodegradability by virtue of the high level of dispersion conferred on the starch in the cellulose-ester matrix.

However, articles produced from the compositions still have too low a decomposition rate during composting.

It has now surprisingly been found that it is possible considerably to increase the biodegradability of articles produced from compositions comprising partially or completely destructurised and/or complexed starch and polysaccharide esters, preferably cellulose esters, and consequently their ability to decompose during composting.

The decomposition times for the articles produced can be reduced to less than two months in standard composting conditions.

The subject matter of the invention is defined by the appended claims.

The compositions of the present invention comprising starch and a polysaccharide ester and preferably a cellulose ester or a starch ester are characterized by a microstructure in which the ester constitutes the matrix and the fraction of destructurised and/or dispersed starch constitutes the dispersed phase, with a numeric mean dimension of the domains or dispersed particles preferably of less than 1 $\mu$m, more preferably less than 0.5 $\mu$m; the compositions contain an additive which can increase and maintain at values of 4 or more the pH of a solution obtained by immersing granules or pellets of the composition in water at ambient temperature for 1 hour with the use of a water:granules (or pellets) ratio of 10:1 by weight.

The term "partially" referred to destructurised or complexed starch is used to contemplate the possible presence of a portion of native crystalline starch up to 30% by wt. with respect to the starting starch content.

The additive, which has the above-mentioned capability to control the pH, has the effect of considerably increasing biodegradability of the compositions by neutralising the acid resulting from hydrolysis of the cellulose ester in composting conditions. Any substance available insoluble in water and having the above-mentioned capability may be a suitable additive.

Examples of additives are carbonates and hydroxides of alka-line-earth metals such as $CaCO_3$, $MgCO_3$, $Mg(OH)_3$. $CaCO_3$ is the preferred additive.

The compositions comprise starch and the polysaccharide ester plasticised with a plasticizer in a quantity of from 10 to 40% by weight referred to the polysaccharide ester, in a ratio by weight of from 1:0.6 to 1:18, preferably from 1:2 to 2:3.

The pH regulating additive is present in a quantity of from 0.5 to 30%, preferably from 5 to 20%, by weight relative to the weight of the starch and of the plasticized polysaccharide ester.

Quantities greater than 30% by weight may be used without any significant further improvement.

Too large a quantity of additive may have an adverse effect on the mechanical properties of the compositions.

In addition to the plasticizer for the polysaccharide ester phase, the compositions may also comprise a plasticizer for the starch phase, used in a quantity of from 0.5 to 50% by weight, relative to the weight of the starch.

To permit the production of a finely dispersed microstructure as indicated above, further polymeric additives belonging to the following classes may be used:

a) polymers compatible with polysaccharide esters and/or starch, to which aliphatic or polyhydroxylated chains containing from 4 to 40 carbon atoms are grafted, b) copolymers of hydroxy-acids and/or diamines with 2–24 carbon atoms with aliphatic or aromatic diisocyanates or with epoxy compounds or anhydrides, c) copolymers of aliphatic polyesters, polyamides, polyureas or polyalkylene glycols with aliphatic or aromatic disocyanates, d) polymers compatible with polysaccharide esters and/or starch to which polyols soluble in starch or polymers capable of complexing starch are grafted, and e) polymers capable of complexing starch, such as ethylene/vinyl alcohol or ethylene/acrylic acid copolymers, aliphatic polyesters and polyamides.

The additives of type a) are preferably obtained by grafting aliphatic chains derived from vegetable or animal fats such as oleic, lauric, myristic, palmitic, stearic, linoleic, arucic and ricinoleic acids having terminal groups such as carboxyl groups, esters or salts to facilitate the grafting of the chains.

Examples of polymers compatible with the cellulose esters are:

cellulose esters with various degrees of substitution (DS), starch esters with various DS values, such as acetates, starch esters with various DS values, such as products of the reaction of starch with ethyelene or propylene glycol, partially hydrolysed polyvinyl acetate, aliphatic polyesters and aliphatic/aromatic copolyesters.

The number of grafted chains is between 0.1 and 100, preferably from 0.2 to 50, more preferably from 0.3 and 20 grafted chains per 100 monomeric units in the polymeric chain.

Examples of additives of type b) and type c) are the copolymers which can be produced from aliphatic polyesters such as polycaprolactones and polyethylene succinates.

Block copolymers between polycaprolactons and an aromatic or aliphatic diisocyanate, such as a caprolactone-urethane co-polymer marketed by Goodrich with the trademark Estane, grade 54351 is representative of the copolymers of class b).

The additives are present in quantities of from 0.1 to 20% by weight, preferably from 0.5 to 10%, relative to the sum of the weight of the starch and of the plasticised polysaccharide ester.

In addition to the components indicated above, the compositions of the invention may contain synthetic polymers in a quantity up to 30% by weight, preferably less than 10%, of polyvinyl alcohol, polyvinyl, acetate, thermoplastic polyesters such as polycaprolactone, copolymers of caprolactone with isocyanates, polymers of lactic acid, polyethylene or polybutylene and, in general, polyalkylene adipate, sebacate, and azelate.

The starch which is used to prepare the composition is a natural starch extracted from various plants such as maize, wheat, potato, tapioca and cereal starch. The term starch also includes starches with a high amylopectine content ("waxy" starches), starches with a high amylose content, chemically and physically modified starches, starches in which the type and concentration of the cations associated with phosphate groups are modified, starch ethoxylate, starch acetates, cationic starches, hydrolysed starches, oxidised and cross-linked starches.

The final composition contains starch which is partially or completely destructurised and/or complexed. As destructurised starch is intended starch which has lost its granular structure (that means absence of Maltese crosses which is visible by optional microscopy in polarised light with magnification in the range of 250–700 x).

As complexed starch is intended starch showing a band in second derivative FTIR around at 946–947 $cm^{-1}$ after removal of the cellulose or starch ester in chloroform (with high starch concentrations without extraction of the cellulose or starch ester) or showing also peaks around 12–13 and 20 of 2 θ(2 theta) in X-ray diffraction experiments.

Representative cellulose and starch esters comprise cellulose acetates, propionates and/or butyrates with various degrees of substitution, such as greater than 2 and preferably greater than 2.4. Cellulose acetate with a DS of from 1.5 to 2.5 is preferred.

The plasticizer usable for the cellulose ester is preferably selected from the following compounds:
  glycerol esters with aliphatic acids containing up to 6 carbon atoms, particularly diacetin and triacetin,
  esters of citric acid, particularly trimethyl or triethyl citrate, as well as acetyl-triethyl citrate,
  dialkyl esters of tartaric acid,
  aliphatic-acid esters, lactones and lactides,
  dialkyl esters of aliphatic acids such as those obtained from oxalic, glutaric, adipic, sebacic, suberic, azelaic acids, preferably dibutyl adipate and dibutyl sebacate,
  dialkyl esters of aromatic acids in which the alkyl group contains from 1 to 10 carbon atoms, particularly dimethyl phthalate, diethyl phthalate, methoxyethyl phthalate and ethoxyethyl phthalate,
  polyethylene glycol adipate, glutarate or sebacate,
  alkyl and aryl phosphates, particularly triethyl and tricreayl phosphates,
  alkyl esters of fatty acids such as butyl oleate,
  polymeric plasticizers such as the products marketed under the trademarks Paraplex by Rohm and Haas, Admex by Arche Daniels Midland, and Flexol by Union Carbide,
  mixed aliphatic-aromatic esters of trimethylol propane and pentaerithritol, polyethylene glycols with alkyl phosphate termination.

The preferred plasticizers are those which act as plasticizers both for the starch phase and for the cellulose ester phase. Acetins belong to this preferred class.

The plasticizers for the starch comprise water, glycerol, glycerol ethoxylate, ethylene glycol or propylene glycol, polyethylene glycol, polypropylene glycol, 1,2-propandiol, 1,3-propandiol, 1,2-, 1,3-, 1,4-butandiol, 1,6-, 1,5-hexandiol, sorbitol diethoxylate, and trimethylolpropane monethoxylate.

The starch is normally plasticized directly during the mixing stage in a mixture with all of the other components. However, it is also possible to use a two-stage method in which the starch phase and the cellulose phase are plasticized separately.

The preparation of the composition of the invention comprises the mixing of the components in a heated extruder or in any closed container which can ensure conditions of temperature and of shear stress adequate to render the starch and cellulose ester components compatible with one another from a rheological point of view, operating at a temperature of between 80 and 210° C. in the presence of water and plasticizers.

The preferred method of preparing the compositions comprises:
  a first step consisting in passing the components through an extruder with times spent in the extruder of the order of from 2 to 50 seconds, during which the starch and the cellulose ester are subjected to bulking under the effect of the plasticizer and possibly of added water, operating at a temperature of between 80 and 180° C.,
  a mixing step, during which the mixture of the previous step is subjected to shear stress conditions suitable in particular for rendering the viscosities of the molten cellulose ester and starch similar, if the starting viscosities are different,
  an optional degassing step to produce a molten mass with a water content of less than 6% by weight which ensures, amongst other things, that bubbles do not form in the extruded product. If expanded materials are to be produced, the water content may be higher than 6% and may reach 18–20% by weight.

The resulting molten material is extruded to form pellets from which articles are produced by means of any conventional technique, or the composition may be extruded directly to produce moulded or injection-moulded articles.

The compositions of the present invention are suitable for the production of foams, foamed extruded containers, foamed extruded sheets, moulded foams, injection-moulded articles such as toys and disposable cutlery and, in general, articles for any use which requires decomposition times no longer than two months during composting. The following examples are provided for illustration purposes and not for limiting the scope of the invention.

EXAMPLES

Examples 1–4 are comparative examples; Examples 5–7 are in accordance with the invention.

(A) Mixing

The compositions of the examples were prepared with the use of a twin-screw APV extruder model 2030 with a diameter of 30 mm and with L:D=25. The temperature profile of the sixteen controlled-temperature zones was as follows:

60° C.×1–100° C.×1–180° C.×14.

The rate of rotation of the screw was 120 rpm.

(B) Injection moulding

The pellets produced by the extruder were supplied to a Sandretto Series 60 injection press to produce shaped test samples. The samples were examined with regard to their surface quality by optical microscopy or by SEM electron microscopy.

The samples were also tested to determine the biodegradation rate.

The results of the tests are given in Tables 1 and 2.

TABLE 1

|  | Ex. 1 | Ex. 2 | Ex. 3 | Ex. 4 | Ex. 5 | Ex. 6 | Ex. 7 |
|---|---|---|---|---|---|---|---|
| Aceplast LS (trademark) | 75 | 44 | 30.5 | 44 | 38 | 40 | 40 |
| CAB (trademark) |  |  | 30.5 |  |  |  |  |
| Diacetin | 25 |  |  | 16 | 14 | 14.7 | 14.7 |
| Epoxydised soya bean oil |  | 16 | 11.1 |  |  |  |  |
| Maize starch |  | 32 | 22.2 | 27 | 25 | 26.3 | 26.3 |
| Acetylised starch with DS = 1.3 |  |  |  |  | 5 |  |  |
| Sorbilene (sorbitol ethoxylate) |  | 7.8 | 5.4 | 7.8 | 7.8 | 8.2 | 8.2 |
| Brucamide |  | 0.2 | 0.14 | 0.2 | 0.2 | 0.2 | 0.2 |
| SAC DS 1.3/laurate 4.6 |  |  |  | 5 |  |  |  |
| SAC DS 1.1/laurate 3.2 |  |  |  |  | 5 |  |  |
| Calcium carbonate |  |  |  |  | 5 | 11.6 |  |
| Magnesium hyroxide |  |  |  |  |  |  |  |
| Clay |  |  |  |  |  |  | 11.6 |
| Footnotes | a | b | c | a,d | d | a,d | a,d |

In table 1, the amounts of the components are in percent by weight.

(a) the material was tested for biodegradability (the results are given in Table 2)

(b) the test sample underwent severe delamination (c) the test sample tended to delaminate (d) the surface of the sample appeared homogeneous without apparent flakes.

All of the samples which had surface characteristics (d) had a microstructure, according to SEM, in which the dispersed starch phase was in the form of domains at least 80% of which had a numeric mean dimension of less than 0.3 $\mu$m.

LEGEND

1) Aceplast LS (trademark) is a cellulose acetate with a degree of substitution of 2.5, marketed by Societa Acetati s.p.A., of Verbania, Italy.

2) CAB is a cellulose butyrate/acetate marketed by Eastman Chemicals under the trademark CAB 831-20.

3) Acetylised starch with DS<1.3 is produced by National Starch and is referred to as "78-0403 GDS-1233".

4) The additives indicated in the table were produced from starch acetate (SAC) with DS 1.3 and 2.1, by grafting lauryl radicals in quantities of 4.2 and 3.2 radicals per 100 monomeric units of BAC.

The grafting was carried out with the use of lauric acid chloride in dimethyl acetamide.

After neutralisation with pyridine, the compatibility agent was precipitated with ethyl ether.

Biodegradability of the compositions

The biodegradability was tested by recording the loss of weight of the samples which were enclosed in a polypropylene net (with 1 mm mesh) and were incorporated in a substrate of an aged compost with 55% humidity and heated to 50° C. in an incubator. A plurality of samples was loaded, that is, one sample per net so that the course of the degradation over time could be followed. For each sample, 50 g of compost was used. The results are given in Table 2.

TABLE 2

Percentage loss of weight undergone by the samples after 15, 60 and 150 days

| Examples | 15 days | 60 days | 150 days |
|---|---|---|---|
| 1 | 18.6 | 23.1 | 26.3 |
| 4 | 29.8 | 39.1 | 51.7 |
| 6 | 40.0 | >90.0 | completely degraded |
| 7 | 50.0 | >90.0 | completely degraded |

What is claimed is:

1. Biodegradable heterophase compositions comprising (1) partially or completely destructurised and/or complexed starch, (2) a polysaccharide ester, and (3) a plasticizer for the polysaccharide ester, in which the polysaccharide ester constitutes the matrix and the starch the dispersed phase, characterized in that the compositions comprise starch and plasticized polysaccharide ester in a ratio by weight of from 1:0.6 to 1:18, the polysaccharide ester is plasticized with a plasticizer in a quantity of from 10 to 40% by weight referred to the polysaccharide ester and the starch is in the form of particles or domains of average numeral dimension lower than 1 $\mu$m for at least 80% of the particles, the biodegradable heterophase compositions further comprising an additive which can increase and maintain a pH of 4 or more for a solution obtained by placing the compositions in pellet or particle form in contact with water at ambient temperature for 1 hour with the use of a pellet/particles:water ratio of 1:10 by weight.

2. Biodegradable compositions according to claim 1, in which the polysaccharide ester is a cellulose ester or a starch ester.

3. Biodegradable compositions according to claim 1, in which the particles or domains of the dispersed phase have dimension lower than 0.5 $\mu$m.

4. Biodegradable compositions according to claim 1, in which the pH regulating additive is selected from carbonates and hydroxides of alkaline-earth metals.

5. Biodegradable compositions according to claim 4, in which the pH regulating additive is selected from calcium and magnesium carbonates.

6. Biodegradable compositions according to claim 1, in which the polysaccharide ester is a cellulose acetate with a degree of substitution of from 1.5 to 2.5.

7. Biodegradable compositions according to claim 1, in which the pH regulating additive is present in a quantity of from 0.5 to 30% by weight relative to the weight of the starch and of the plasticised cellulose ester.

8. Biodegradable compositions according to claim 7, in which the pH regulating additive is present in a quantity of from 5 to 20%.

9. Biodegradable compositions according to claim 1, comprising a further polymeric additive selected from the group consisting of:

- polymers or copolymers compatible with the polysaccharide ester, grafted with aliphatic or polyhydroxylated chains containing from 4 to 40 carbon atoms,
- copolymers obtained from hydroxy-acids and diamines with 2–24 carbon atoms, aliphatic polyesters, polyamides, polyureas and polyalkylene glycols with aliphatic or aromatic diisocyanates,
- copolymers produced from polymers compatible with the polysaccharide esters by grafting polyols soluble in starch.

10. Biodegradable compositions according to claim 9, in which said further polymeric additive is used in a quantity of from 0.1 to 20% by weight relative to the weight of the starch and of the plasticised cellulose ester.

11. Biodegradable compositions according to claim 1, in which the further polymeric additive is selected from the group consisting of a polymer or copolymer compatible with the cellulose ester grafted with a fatty acid selected from oleic, lauric, palmitic, stearic, erucic, linoleic, and ricinoleic acids and a block copolymer between polycaprolactone and an aliphatic or aromatic diisocyanate.

12. Biodegradable compositions according to claim 1 comprising a plasticizer for the starch phase, used in a quantity of from 0.5 to 50% relative to the weight of the starch.

13. Biodegradable compositions according to claim 1, in which the ratio of plasticized cellulose-ester:starch is between 2:1 and 3:1 by weight.

14. Manufactured articles produced from the compositions of claim 1.

15. Manufactured articles according to claim 14, suitable for the production of foams, foamed extruded containers, foamed extruded sheets, and moulded foams.

16. A method for increasing the biodegradability of articles produced from biodegradable heterophase compositions comprising partially or completely destructurised and/or complexed starch, a polysaccharide ester and a plasticizer for the polysaccharide ester, in which the polysaccharide ester constitutes the matrix and the starch the dispersed phase, in form of particles or domains having an average numeral size lower than 1 $\mu$m for at least 80% of the particles, comprising adding to said composition an additive which increases and maintains a pH of 4 or more for a solution obtained by placing the compositions in pellet or particles form in contact with water at ambient temperature for 1 hour with a pellet (or particle)/water ratio of 1:10 by weight.

* * * * *

UNITED STATES PATENT AND TRADEMARK OFFICE
CERTIFICATE OF CORRECTION

PATENT NO. : 6,730,724 B1
DATED : May 4, 2004
INVENTOR(S) : Catia Bastioli et al.

It is certified that error appears in the above-identified patent and that said Letters Patent is hereby corrected as shown below:

Column 6,
Line 47, change "can increase and maintain" to -- increases and maintains --

Signed and Sealed this

Thirtieth Day of November, 2004

JON W. DUDAS
*Director of the United States Patent and Trademark Office*